(12) United States Patent
Hillan et al.

(10) Patent No.: US 10,690,762 B2
(45) Date of Patent: Jun. 23, 2020

(54) SYSTEMS AND METHODS FOR DETERMINING AN UPPER BOUND ON THE DISTANCE BETWEEN DEVICES

(71) Applicant: QUALCOMM Incorporated, San Diego, CA (US)

(72) Inventors: John Hillan, Farnborough (GB); Jeremy Robin Christopher O'Donoghue, Wokingham (GB); Stephen Frankland, Horsham (GB)

(73) Assignee: QUALCOMM Incorporated, San Diego, CA (US)

( * ) Notice: Subject to any disclaimer, the term of this patent is extended or adjusted under 35 U.S.C. 154(b) by 686 days.

(21) Appl. No.: 14/971,723

(22) Filed: Dec. 16, 2015

(65) Prior Publication Data
US 2016/0349347 A1   Dec. 1, 2016

Related U.S. Application Data

(60) Provisional application No. 62/168,579, filed on May 29, 2015.

(51) Int. Cl.
*G01S 5/00* (2006.01)
*G01S 13/08* (2006.01)
*H04L 9/32* (2006.01)

(52) U.S. Cl.
CPC ............ *G01S 13/08* (2013.01); *H04L 9/3271* (2013.01)

(58) Field of Classification Search
CPC .............................. G01S 5/0045; G01S 5/0018
(Continued)

(56) References Cited

U.S. PATENT DOCUMENTS

| 3,568,187 A | 3/1971 | Bechtel et al. |
| 8,521,091 B2 | 8/2013 | Miscopein et al. |

(Continued)

FOREIGN PATENT DOCUMENTS

| DE | 102012022735 A1 | 5/2014 |
| JP | 2003279648 A | 10/2003 |

(Continued)

OTHER PUBLICATIONS

Sangho, "Distance Bounding with Delayed Responses", IEEE Communications Letters, IEEE Service Center, Picasaway, NJ, US, vol. 16, No. 9, Sep. 1, 2012, pp. 1478-1481, XP011461898, ISSN: 1089-7798, DOI: 10.1109/LCOMM.2012.073112.121134 (Year: 2012).*

(Continued)

*Primary Examiner* — Vladimir Magloire
*Assistant Examiner* — Helena H Seraydaryan
(74) *Attorney, Agent, or Firm* — Austin Rapp & Hardman, P.C.

(57) ABSTRACT

A method for determining a distance upper bound by a verifier device is described. The method includes measuring a first round-trip time to receive a first response from a target device corresponding to a first message sent to the target device. The method also includes measuring a second round-trip time to receive a second response from the target device corresponding to a second message sent to the target device, the second response being delayed by a processing time multiplier. The method further includes determining a transit time measurement based on the first round-trip time, the second round-trip time and the processing time multiplier. The method additionally includes determining the distance upper bound based on the transit time measurement.

44 Claims, 9 Drawing Sheets

(58) Field of Classification Search
USPC .......................................................... 342/387
See application file for complete search history.

(56) References Cited

U.S. PATENT DOCUMENTS

| | | | |
|---|---|---|---|
| 8,811,199 | B2 | 8/2014 | Nixon et al. |
| 8,982,935 | B2 | 3/2015 | Subramanian et al. |
| 9,294,280 | B2 | 3/2016 | Malaney |
| 9,467,798 | B2 | 10/2016 | Ignatchenko et al. |
| 2007/0009102 | A1 | 1/2007 | Gong et al. |
| 2007/0033419 | A1 | 2/2007 | Kocher et al. |
| 2008/0049938 | A1 | 2/2008 | Singhal |
| 2008/0250243 | A1 | 10/2008 | Bretheim |
| 2009/0004969 | A1 | 1/2009 | Luong |
| 2009/0059797 | A1 | 3/2009 | Northcutt et al. |
| 2009/0083544 | A1 | 3/2009 | Scholnick et al. |
| 2010/0009627 | A1 | 1/2010 | Huomo |
| 2010/0079261 | A1 | 4/2010 | Goto et al. |
| 2010/0134256 | A1 | 6/2010 | Mihota |
| 2010/0135178 | A1 | 6/2010 | Aggarwal et al. |
| 2010/0295664 | A1 | 11/2010 | Kim |
| 2012/0309303 | A1 | 12/2012 | Hillan et al. |
| 2013/0102252 | A1 | 4/2013 | Rasmussen et al. |
| 2014/0059648 | A1 | 2/2014 | Danev et al. |
| 2014/0082696 | A1 | 3/2014 | Danev et al. |
| 2014/0269400 | A1 | 9/2014 | Aldana et al. |
| 2014/0282947 | A1 | 9/2014 | Ignatchenko et al. |
| 2015/0181553 | A1 | 6/2015 | Segev |
| 2015/0302230 | A1 | 10/2015 | Wacker et al. |
| 2016/0127931 | A1 | 5/2016 | Baxley et al. |
| 2016/0234008 | A1 | 8/2016 | Hekstra et al. |
| 2016/0352605 | A1 | 12/2016 | O'Donoghue et al. |
| 2017/0127225 | A1 | 5/2017 | Hillan |

FOREIGN PATENT DOCUMENTS

| | | | |
|---|---|---|---|
| JP | 2005520139 | A | 7/2005 |
| WO | 03077432 | A2 | 9/2003 |
| WO | 2010059934 | A2 | 5/2010 |
| WO | 2014079561 | A1 | 5/2014 |

OTHER PUBLICATIONS

Ranganathan A., et al., "Low-Power Distance Bounding," Institute of Information Security Dept. of Computer Science, ETH Zurich Zurich, Switzerland, Apr. 18, 2014, pp. 1-14.
Hancke G P., et al., "An RFID Distance Bounding Protocol", SECURECOMM2005, IEEE, Sep. 5, 2005 (Sep. 5, 2005), pp. 67-73, XP010902873, DOI: 10.1109/SECURECOMM.2005.56, ISBN: 978-0-7695-2369-9, the whole document.
International Search Report and Written Opinion—PCT/US2016/026036—ISA/EPO—dated Jun. 30, 2016.
Lee S., et al., "Distance Bounding with Delayed Responses", IEEE Communications Letters, IEEE Service Center, Piscataway, NJ, US, vol. 16, No. 9, Sep. 1, 2012 (Sep. 1, 2012), pp. 1478-1481, XP011461898, ISSN: 1089-7798, DOI: 10.1109/LCOMM.2012.073112.121134.
Abu-Mahfouz A., et al., "Distance Bounding: A Practical Security Solution for Real-Time Location Systems", IEEE Transactions on Industrial Informatics, IEEE Service Center, New York, NY, US, vol. 9, No. 1, Feb. 1, 2013 (Feb. 1, 2013), pp. 16-27, XP011482906, ISSN: 1551-3203, DOI: 10.1109/TII.2012.2218252.
Brands S., et al., "Distance-Bounding Protocols", May 23, 1993 (May 23, 1993), Advances in Cryptology Eurocrypt 93, Springer Berlin Heidelberg, Berlin, Heidelberg, pp. 344-359, XP019194028, ISBN: 978-3-540-57600-6.
Hancke G.P., et al., "An RFID Distance Bounding Protocol", SECURECOMM2005, IEEE, Sep. 5, 2005 (Sep. 5, 2005), pp. 67-73, XP010902873, DOI: 10.1109/SECURECOMM.2005.56, ISBN: 978-0-7695-2369-9.
Liang L.W., et al., "A Self-Calibrating NFC SoC with a Triple-Mode Reconfigurable PLL and a Single-Path PICC-PCD Receiver in 0.11 [mu]m", IEEE International Solid State Circuits Conference, IEEE Service Center, New York, NY, US, Feb. 9, 2014, XP032574988, pp. 158-159.

* cited by examiner

SYSTEMS AND METHODS FOR DETERMINING AN UPPER BOUND ON THE DISTANCE BETWEEN DEVICES

RELATED APPLICATIONS

This application is related to and claims priority from U.S. Provisional Patent Application Ser. No. 62/168,579, filed May 29, 2015, for "SYSTEMS AND METHODS FOR DETERMINING AN UPPER BOUND ON THE DISTANCE BETWEEN DEVICES."

TECHNICAL FIELD

The present disclosure relates generally to communications. More specifically, the present disclosure relates to systems and methods for the accurate determination of an upper bound on the distance between devices.

BACKGROUND

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of wired and wireless communication technologies. For example devices may perform cellular communications, wireless local area network (WLAN) communications, near field communication (NFC), fiber optic communication, etc.

In some scenarios, communication between a verifier device and a target device may rely on the distance between the devices. For example, security may be enhanced if an accurate upper bound on the distance between devices is known. Benefits may be realized for determining a distance upper bound between devices.

SUMMARY

A method for determining a distance upper bound by a verifier device is described. The method includes measuring a first round-trip time to receive a first response from a target device corresponding to a first message sent to the target device. The method also includes measuring a second round-trip time to receive a second response from the target device corresponding to a second message sent to the target device, the second response being delayed by a processing time multiplier. The method further includes determining a transit time measurement based on the first round-trip time, the second round-trip time and the processing time multiplier. The method additionally includes determining the distance upper bound based on the transit time measurement.

The processing time multiplier may indicate an amount of time that the target device delays responding to a message sent by the verifier device. Upon receiving the second message, the target device may scale a processing time by the processing time multiplier before responding to the second message. The processing time multiplier may be known by the verifier device and the target device.

The processing time multiplier may be a fixed value. The processing time multiplier may be determined based on content of the second message sent to the target device.

The transit time measurement may be determined according to $T_f=(n \cdot T_{round,1}-T_{round,2})/2(n-1)$, where $T_f$ is the transit time, n is the processing time multiplier, $T_{round,1}$ is the first round-trip time and $T_{round,2}$ is the second round-trip time.

Determining the distance upper bound may include multiplying the transit time measurement by the speed of light. The distance upper bound may be an upper bound for a distance between the verifier device and the target device.

The distance upper bound may be determined based on at least one additional transit time measurement in which the target device delays responding according to the processing time multiplier. The processing time multiplier may include a sequence of values, one of the values being applied for a given round-trip time measurement.

The method may also include measuring at least one additional round-trip time. At least one additional transit time measurement may be determined using the at least one additional round-trip time. An average transit time measurement may be determined. The distance upper bound may be determined based on the average transit time measurement.

The verifier device may be a reader device and the target device may be a listening device. The first message and the second message may include challenge messages sent to the listening device.

The verifier device may be a listening device and the target device may be a reader device. The first message and the second message may include responses to challenges received from the reader device.

A verifier device configured to determine a distance upper bound is also described. The verifier device includes a processor, a memory in communication with the processor, and instructions stored in the memory. The instructions are executable by the processor to measure a first round-trip time to receive a first response from a target device corresponding to a first message sent to the target device. The instructions are also executable to measure a second round-trip time to receive a second response from the target device corresponding to a second message sent to the target device, the second response being delayed by a processing time multiplier. The instructions are further executable to determine a transit time measurement based on the first round-trip time, the second round-trip time and the processing time multiplier. The instructions are additionally executable to determine the distance upper bound based on the transit time measurement.

An apparatus configured to determine a distance upper bound is also described. The apparatus includes means for measuring a first round-trip time to receive a first response from a target device corresponding to a first message sent to the target device. The apparatus also includes means for measuring a second round-trip time to receive a second response from the target device corresponding to a second message sent to the target device, the second response being delayed by a processing time multiplier. The apparatus further includes means for determining a transit time measurement based on the first round-trip time, the second round-trip time and the processing time multiplier. The apparatus additionally includes means for determining the distance upper bound based on the transit time measurement.

A computer-program product for determining a distance upper bound is also described. The computer-program product includes a non-transitory computer-readable medium having instructions thereon. The instructions include code for causing a verifier device to measure a first round-trip time to receive a first response from a target device corresponding to a first message sent to the target device. The instructions also include code for causing the verifier device to measure a second round-trip time to receive a second response from the target device corresponding to a second message sent to the target device, the second response being delayed by a processing time multiplier. The instructions further include code for causing the verifier device to determine a transit time measurement based on the first round-trip time, the second round-trip time and the processing time multiplier. The instructions additionally include code for causing the verifier device to determine the distance upper bound based on the transit time measurement.

A method for determining when to delay sending a response for a distance upper bound determination operation is also described. The method includes sending, by a target device, a first response to a verifier device corresponding to a first message received from the verifier device. The method also includes sending, by the target device, a second response that is delayed by a processing time multiplier to the verifier device, the second response corresponding to a second message received from the verifier device. The verifier device determines the distance upper bound based on a first round-trip time, a second round-trip time and the processing time multiplier.

A target device configured to determine when to delay sending a response for a distance upper bound determination operation is also described. The target device includes a processor, a memory in communication with the processor, and instructions stored in the memory. The instructions are executable by the processor to send a first response to a verifier device corresponding to a first message received from the verifier device. The instructions are also executable to send a second response that is delayed by a processing time multiplier to the verifier device, the second response corresponding to a second message received from the verifier device. The verifier device determines the distance upper bound based on a first round-trip time, a second round-trip time and the processing time multiplier.

An apparatus configured to determine when to delay sending a response for a distance upper bound determination operation is also described. The apparatus includes means for sending a first response to a verifier device corresponding to a first message received from the verifier device. The apparatus also includes means for sending a second response that is delayed by a processing time multiplier to the verifier device, the second response corresponding to a second message received from the verifier device. The verifier device determines the distance upper bound based on a first round-trip time, a second round-trip time and the processing time multiplier.

A computer-program product for determining when to delay sending a response for a distance upper bound determination operation is also described. The computer-program product includes a non-transitory computer-readable medium having instructions thereon. The instructions include code for causing a target device to send a first response to a verifier device corresponding to a first message received from the verifier device. The instructions also include code for causing the target device to send a second response that is delayed by a processing time multiplier to the verifier device, the second response corresponding to a second message received from the verifier device. The verifier device determines the distance upper bound based on a first round-trip time, a second round-trip time and the processing time multiplier.

DETAILED DESCRIPTION

Figure 1:
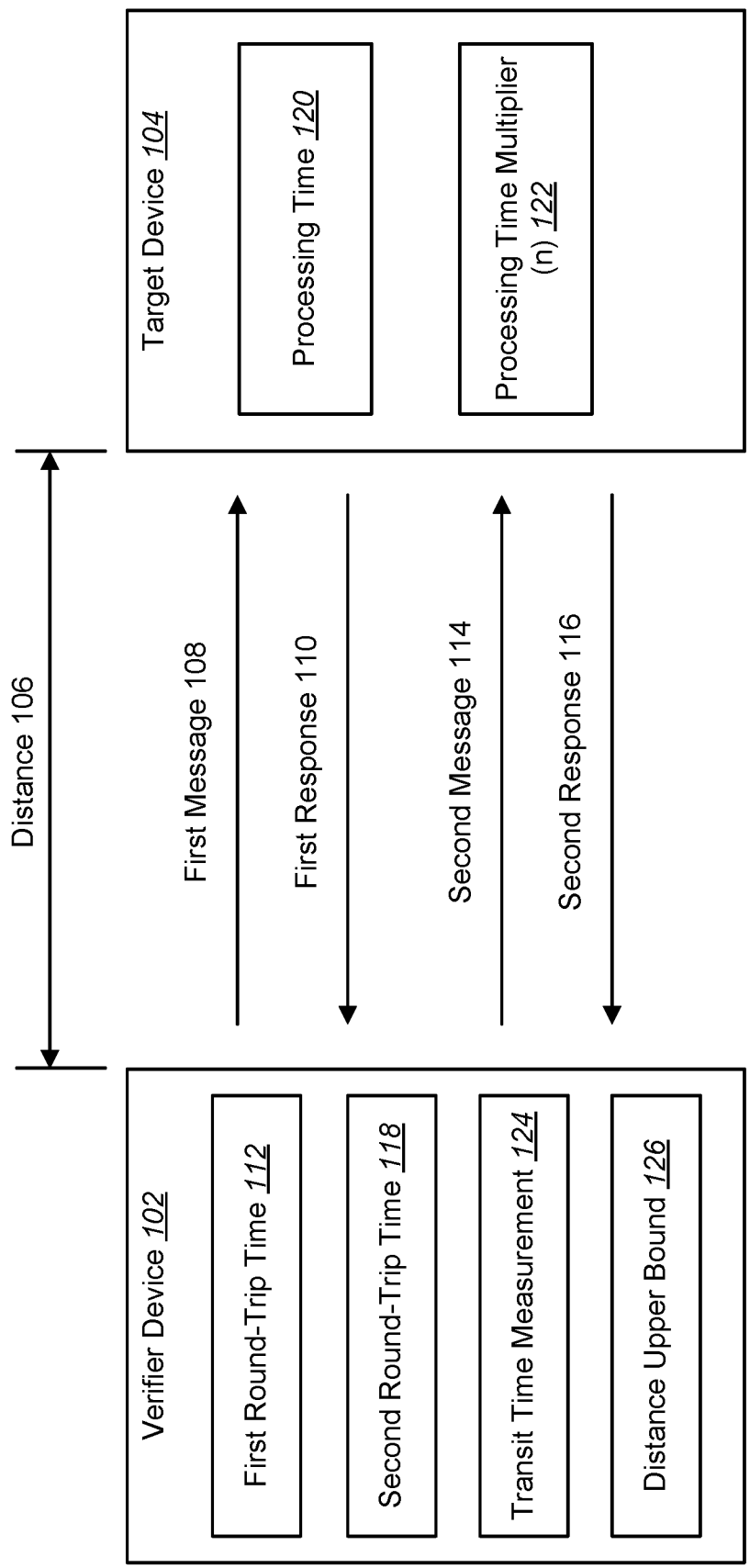
FIG. 1 is a block diagram illustrating one configuration of a communication system for determining a distance upper bound between devices.

In certain situations, it is advantageous for a device to be able to determine an upper bound for the distance to another device. For example, it may be beneficial in a security context to ascertain that a building access badge is physically close to a door reader. Signal strength measurements tend to have a wide variance that makes accurate determination of distance hard to accomplish, and by manipulating the transmitter it is possible for a malicious device to pretend to be closer than the actual separation.

According to the systems and methods described herein, a verifier device may use a round-trip delay for a signal to measure the transit time of the signal. From the transit time measurement, the verifier device may determine an upper bound on the distance to the target device. Because nothing can travel faster than the speed of light, a signal (e.g., radio signal) can reliably be used to place an upper bound on the distance to the target device. The target device might be closer, but it cannot be farther away.

It should be noted that some communication devices may communicate wirelessly and/or may communicate using a wired connection or link. For example, some communication devices may communicate with other devices using an Ethernet protocol. The systems and methods disclosed herein may be applied to communication devices that communicate wirelessly and/or that communicate using a wired connection or link. In one configuration, the systems and methods disclosed herein may be applied to a communication device that communicates with another device using near-field communication (NFC).

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a communication system 100 for determining a distance upper bound 126 between devices. The communication system 100 may include a verifier device 102 and a target device 104. The verifier device 102 or the target device 104 may also be referred to as an electronic communication device, mobile device, mobile station, subscriber station, client, client station, user equipment (UE), remote station, access terminal, mobile terminal, terminal, user terminal, subscriber unit, etc. Examples of devices include laptop or desktop computers, card readers, cellular phones, smart phones, wireless modems, e-readers, tablet devices, gaming systems, etc. Some of these devices may operate in accordance with one or more industry standards.

The verifier device 102 and the target device 104 may communicate using one or more communication technologies. These communication technologies may include wired communication technologies and wireless communication technologies.

The verifier device 102 and the target device 104 may communicate using one or more communication technologies that operate at the speed of light. These technologies may include, but are not limited to, radio frequency (RF), visible light ("LiFi"), microwave, and infrared communication.

In a configuration, the verifier device 102 and the target device 104 may communicate using inductively coupled communication. In an implementation of inductively coupled communication, the verifier device 102 and the target device 104 may use near field communication (NFC). In another implementation, the verifier device 102 and the target device 104 may use radio-frequency identification (RFID).

In another configuration, the verifier device 102 and the target device 104 may operate in accordance with certain industry standards, such as Third Generation Partnership Project (3GPP) Long Term Evolution (LTE) standards. Other examples of standards that a communication device may comply with include Institute of Electrical and Electronics Engineers (IEEE) 802.11a, 802.11b, 802.11g, 802.11n and/or 802.11ac (e.g., Wireless Fidelity or "Wi-Fi") standards, Bluetooth, IEEE 802.16 (e.g., Worldwide Interoperability for Microwave Access or "WiMAX") standards, Code Division Multiple Access (CDMA) 2000 1× (referred to herein as "1×", may also be referred to as IS-2000 or 1×RTT) standards, Evolution-Data Optimized (EVDO) standards, Interim Standard 95 (IS-95), High Data Rate (HDR), High Rate Packet Data (HRPD), evolved High Rate Packet Data (eHRPD), radio standards and others. WWAN may also include Wireless Metropolitan Area Networking (WMAN) standards and High-Speed Downlink Packet Access (HSDPA) standards. While some of the systems and methods disclosed herein may be described in terms of one or more standards, this should not limit the scope of the disclosure, as the systems and methods may be applicable to many systems and/or standards.

The verifier device 102 and the target device 104 may be separated by a distance 106. In certain situations, it may be advantageous to be able to determine a distance upper bound 126 from a verifier device 102 to a target device 104. This becomes especially important when attempting to verify that a device (i.e., the target device 104) being presented to another device (i.e., the verifier device 102) for a transaction is physically close in order to thwart relay attacks.

Figure 4:
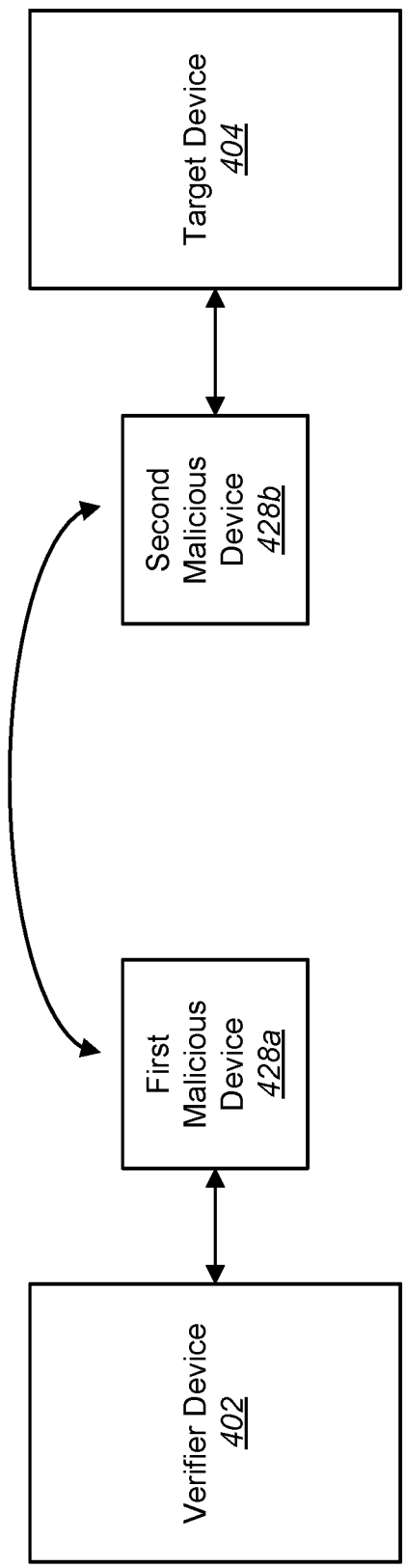
FIG. 4 is a block diagram illustrating an example of a relay attack.

Normal security protocols, such as for building access or payment, only verify that a device being presented is able to respond correctly to one or more challenges. However, it is possible to circumvent this by relaying the challenge to a genuine device, then relaying the response back to the device under attack. When considering that all that would be needed is a pair of devices (e.g., smart phones) with a malicious program to perform this relay, the potential number of attacks is huge. FIG. 4 illustrates an example of a relay attack.

If the device under attack (e.g., the verifier device 102) is able to determine that the device being presented (e.g., the target device 104) is physically close, this type of attack becomes far more difficult. A number of approaches have been proposed but all suffer from drawbacks. In one approach, distance may be determined based on signal strength measurements. However, signal strength measurements tend to have a wide variance that makes accurate determination of distance hard to accomplish. Furthermore, by manipulating a transmitter, it is possible to pretend to be closer than the actual separation.

Another approach is to use the round-trip delay (i.e., transit time) for a signal. As used herein, "transit time" refers to the amount of time it takes for a signal to travel between two points. For example, the transit time for a signal sent by the verifier device 102 to the target device 104 is the amount of time for the signal to reach the target device 104 once the verifier device 102 transmits the signal. Transit time may also be referred to as transit time, time-of-flight, time interval or other equivalent terms.

Since nothing can travel faster than the speed of light, a signal (e.g., radio or light signal) can reliably be used to place an upper bound on the distance 106 (i.e., distance upper bound 126) from the verifier device 102 to the target device 104. The target device 104 might be closer, but it cannot be farther away than the distance upper bound 126.

Figure 5:
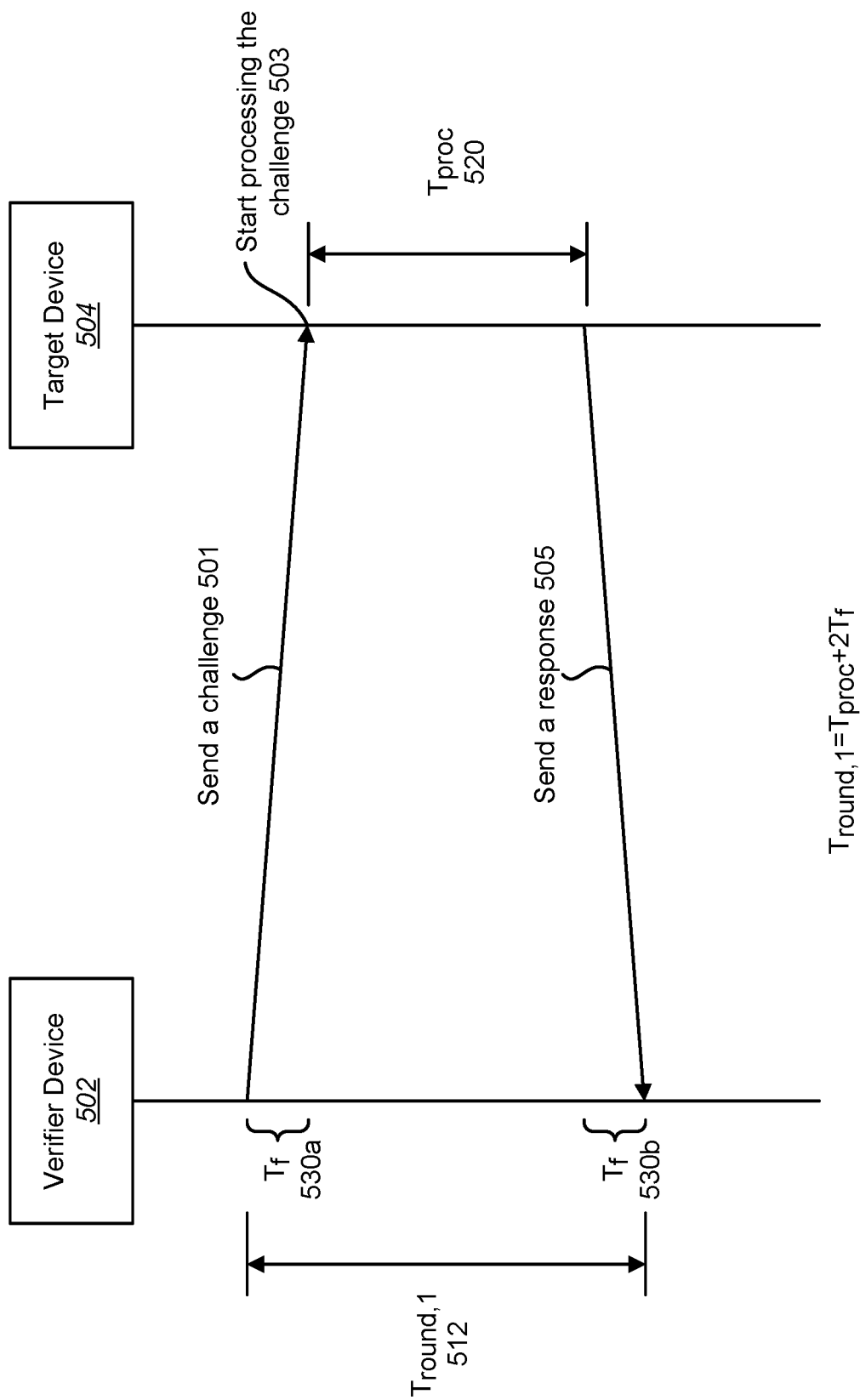
FIG. 5 is a sequence diagram illustrating one approach to calculating a transit time by a verifier device.

The main drawback to this approach is that communication transit times are extremely short, especially when trying to establish location to human dimensions. Even a 1 nanosecond (ns) round trip corresponds to a separation of 15 centimeters (cm). This means that any processing delay in the remote device can quickly swamp the transit time and lead to huge uncertainty in the distance upper bound 126 measurement. FIG. 5 shows this situation.

The systems and method described herein provide for eliminating the effects of the processing delay in the remote device when performing a distance upper bound 126 determination operation. This may allow for more accurate distance measurements.

In one configuration, the verifier device 102 may be a reader/writer and the target device 104 may be a listening device. For example, the verifier device 102 may be an NFC reader/writer and the target device 104 may be an NFC card.

The verifier device 102 may determine a distance upper bound 126 based in part on a round-trip time measurement that is delayed by a processing time multiplier 122. The processing time multiplier 122 indicates an amount of time that the target device 104 delays responding to a message sent by the verifier device 102.

The verifier device 102 may measure a first round-trip time 112. The first round-trip time 112 may include the transit time for sending a first message 108 to the target device 104, a processing time 120 by the target device 104 and the transit time to receive a first response 110 from the target device 104.

The processing time 120 may be the amount of time that the target device 104 takes to process a message received from the verifier device 102. The processing time 120 may also be referred to as a processing delay. For example, if the first message 108 is a challenge, then the processing time 120 is the amount of time that the target device 104 takes to process the challenge, generate a response and send the response. The first round-trip time 112 may be expressed according to Equation (1).

$$T_{round,1} = T_{proc} + 2 \cdot T_f \quad (1)$$

In Equation (1), $T_{round,1}$ is the first round-trip time 112, $T_{proc}$ is the processing time 120 for the target device 104 to process the first message 108 and $T_f$ is the transit time that is multiplied by 2 due to the verifier device 102 sending the first message 108 and receiving the first response 110.

In a second message/response exchange, the target device 104 may delay the response according to a processing time multiplier 122. In this exchange, the verifier device 102 may measure a second round-trip time 118 that includes the transit time for sending a second message 114 to the target device 104, a processing time multiplier 122 (n) applied by the target device 104 and the transit time to receive a second response 116 from the target device 104.

The processing time multiplier 122 indicates an amount of time that the target device 104 delays responding to a message sent by the verifier device 102. Upon receiving the second message 114, the target device 104 may scale the processing time 120 by the processing time multiplier 122 before responding to the second message 114. The second round-trip time 118 may be expressed according to Equation (2).

$$T_{round,n} = n \cdot T_{proc} + 2 \cdot T_f \quad (2)$$

In Equation (2), $T_{round,n}$ is the second round-trip time 118, and n is the processing time multiplier 122 for the target device 104 to process the second message 114. Once again, the transit time $T_f$ is multiplied by 2 due to the verifier device 102 sending the second message 114 and receiving the second response 116.

The verifier device 102 may determine a transit time measurement 124 based on the first round-trip time 112, the second round-trip time 118 and the processing time multiplier 122 (n). Because the processing time multiplier 122 (n) represents the scale factor for the target device 104 (e.g., a card) to use in its processing time 120 delay, the transit time measurement 124 $T_f$ may be determined according to the following equations. Multiplying the first round-trip time 112 by the processing time multiplier 122 (n) results in $$n \cdot T_{round,1} = n \cdot T_{proc} + 2n \cdot T_f. \quad (3)$$

$$n \cdot T_{round,1} - T_{round,n} = n \cdot T_{proc} + 2n \cdot T_f - n \cdot T_{proc} - 2 \cdot T_f \quad (4)$$
$$= 2n \cdot T_f - 2 \cdot T_f$$
$$= 2T_f(n-1)$$

$$T_f = \frac{n \cdot T_{round,1} - T_{round,n}}{2(n-1)} \quad (5)$$

Figure 6:
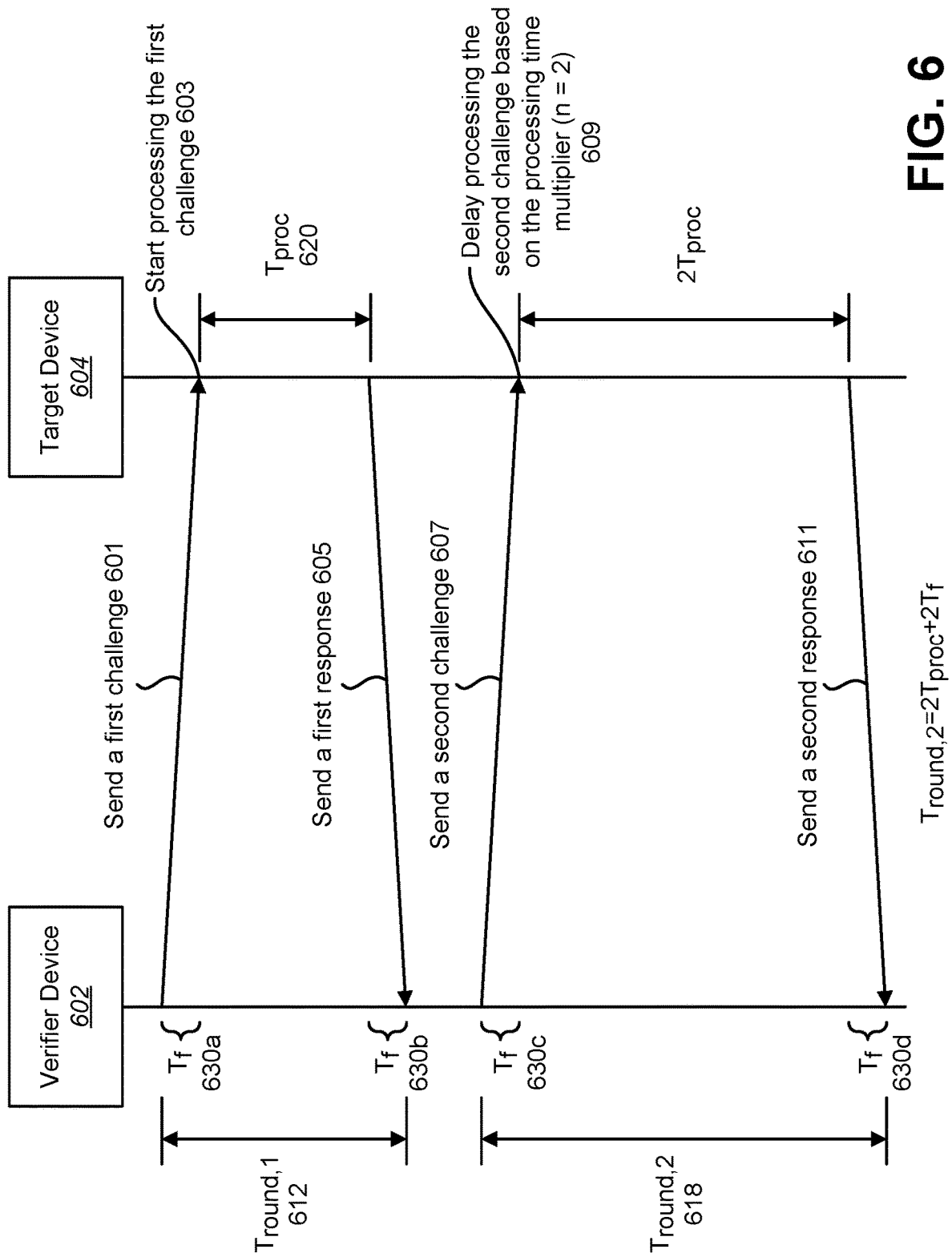
FIG. 6 is a sequence diagram illustrating an approach for calculating a transit time according to the described systems and methods.

It should be noted that according to Equation (5), the verifier device 102 (e.g., reader/writer) may calculate the transit time independently of the actual processing time 120 of the target device 104. In other words, the verifier device 102 need not know the processing time 120 of the target device 104 to determine the transit time measurement 124. Although the target device 104 must be able to scale its processing time 120 accurately, this approach does not rely on this processing time 120 being short. FIG. 6 illustrates an example where the processing time multiplier 122 (n) is 2.

The verifier device 102 may determine a distance upper bound 126 between the verifier device 102 and the target device 104 based on the transit time measurement 124. Once the transit time measurement 124 $T_f$ is determined to the desired accuracy, the verifier device 102 may determine the distance upper bound 126 by multiplying the transit time measurement 124 by the speed of light (c). The distance upper bound 126 may be expressed as $T_f \cdot c$.

This distance upper bound 126 may be an upper bound of a measure of the distance 106 (or separation) between the verifier device 102 and the target device 104. Therefore, the verifier device 102 and the target device 104 may be closer than the distance upper bound 126, but the verifier device 102 and the target device 104 cannot be farther apart.

It should be noted that according to Equations (1)-(5), it is assumed that the transit time out and the transit time back are the same. Therefore, $2 \cdot T_f$ is the total transit time. If the processing time 120 of the target device 104 is large, then it may be possible that the verifier device 102 and the target device 104 could have moved relative to each other. This scenario will not be a practical issue for a device being held by a user assuming a practical processing time 120. However, even in extreme cases where the target device 104 processing time 120 is slow and the distance 106 between the verifier device 102 and the target device 104 is changing quickly, the verifier device 102 will determine an average of the device separation. In this case, the time measurements are going to show the distance 106 as changing. This can be used as another criterion for refusing to communicate with the target device 104.

It should also be noted that by repeating the round-trip time measurements multiple times, minor fluctuations in the processing delay may be averaged out, improving the accuracy of the transit time measurement 124 still further. Therefore, in an implementation, the verifier device 102 may determine the distance upper bound 126 based on at least one additional transit time measurement 124 in which the target device 104 delays its response according to the processing time multiplier 122.

In this implementation, the verifier device 102 may measure at least one additional round-trip time to receive a response from the target device 104. The response from the target device 104 may or may not be delayed by the processing time multiplier 122. Furthermore, the processing time multiplier 122 used in the one or more round-trip time measurements may be the same value, or may be a different value. In other words, the processing time multiplier 122, in this implementation, may be a sequence of values that are applied for a given round-trip time measurement. For example, in one round-trip time measurement the processing time multiplier 122 may be 2, while in another round-trip time measurement the processing time multiplier 122 may be 3.

The verifier device 102 may then determine at least one additional transit time measurement 124 using the at least one additional round-trip time. For each round-trip time measurement, the verifier device 102 may determine a transit time measurement 124 according to Equation (5). The verifier device 102 may determine an average transit time measurement 124 using each of the multiple transit time measurements 124. The verifier device 102 may determine the distance upper bound 126 by multiplying the average transit time measurement 124 by the speed of light.

The processing time multiplier 122 may be known by the verifier device 102 and the target device 104 but not known to other devices. The manner for determining the processing time multiplier 122 to apply for a given response can be chosen to suit the needs of a particular application. In one implementation, for a simple, non-secure establishment of the distance upper bound 126 measurement, a fixed sequence of the processing time multiplier 122 ($n$) could be used, such as 2-2-2-2, or 2-3-4-2-3-4. Additional single processing delay responses (i.e., n=1) can be included at any predetermined location, if desired.

In another implementation, more sophistication can be introduced by making the processing time multiplier 122 ($n$) depend on the content of the message sent by the verifier device 102. For example, if this is a single bit, then a 1 could increment the agreed processing time multiplier 122 ($n$) and a zero could decrement n. Combinations of these two mechanisms could also be implemented.

In yet another implementation, given a sufficient number of round-trip time measurements, the verifier device 102 may determine the transit time even if the sequence of the processing time multiplier 122 ($n$) is not deterministic. The verifier device 102 knows that for a given processing time multiplier 122 ($n$), Equation (2) provides that $T_{round,n} = n \cdot T_{proc} + 2 \cdot T_f$. Therefore, the verifier device 102 can compare the array of times against the various possible values of the processing time multiplier 122 ($n$).

Figure 7:
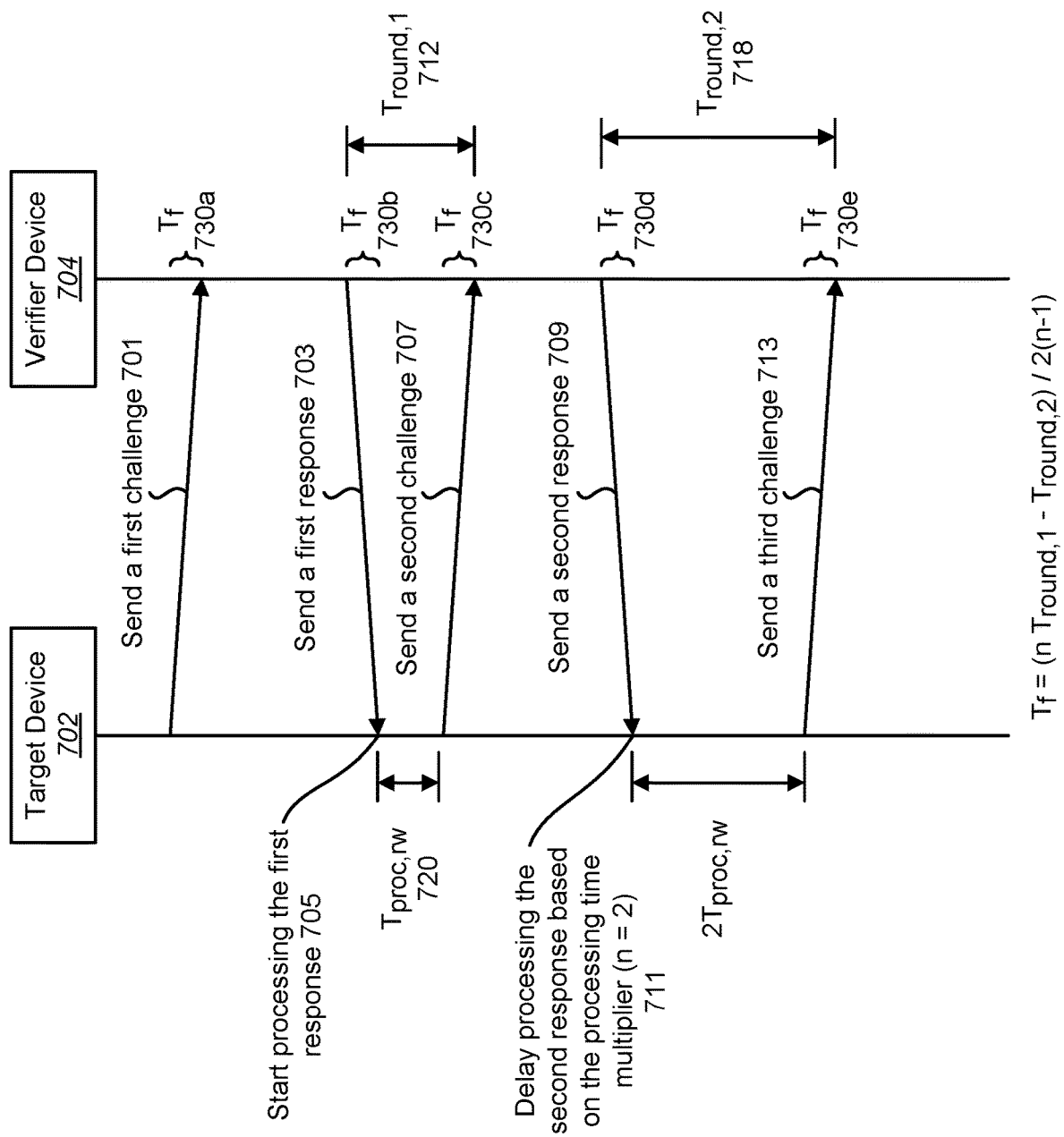
FIG. 7 is a sequence diagram illustrating another approach for calculating a transit time according to the described systems and methods.

In some scenarios, the device being presented for access or payment is itself a smart device. For example, a smart phone may be a listening device that receives a challenge from a reader device. It may be beneficial for the listening device to also verify the distance to the reader device. In this case, the roles may be reversed and the listening device may act as the verifier device 102 and the reader device may act as the target device 104. This can be accomplished by a simple extension of the approach presented above, as shown in FIG. 7. As an example, the access or payment application of a listening device (e.g., smart phone) may require a check that the potential reader is physically close before it will allow itself to be accessed.

The mechanism by which the listening device determines a distance upper bound 126 to the reader device may be the same as that used for the reverse direction. In other words, the listening device may determine the transit time according to Equation (5). The distance upper bound 126 to the reader device may be determined by multiplying the transit time by the speed of light.

It is extremely difficult for a malicious device to defeat this approach by adjusting its processing time to pretend to be closer than it actually is. This is because in order to make the response arrive at the verifier device 102 (e.g., reader/writer) at the correct time, scaling the processing time is not simply doubling. Since a malicious device does not know the distance 106 to the verifier device 102, it does not know $T_f$, so it cannot determine the necessary processing time 120 or processing time multiplier 122 it needs to use to pretend to be at a shorter distance. This scenario is described in connection with FIG. 8.

Figure 2:
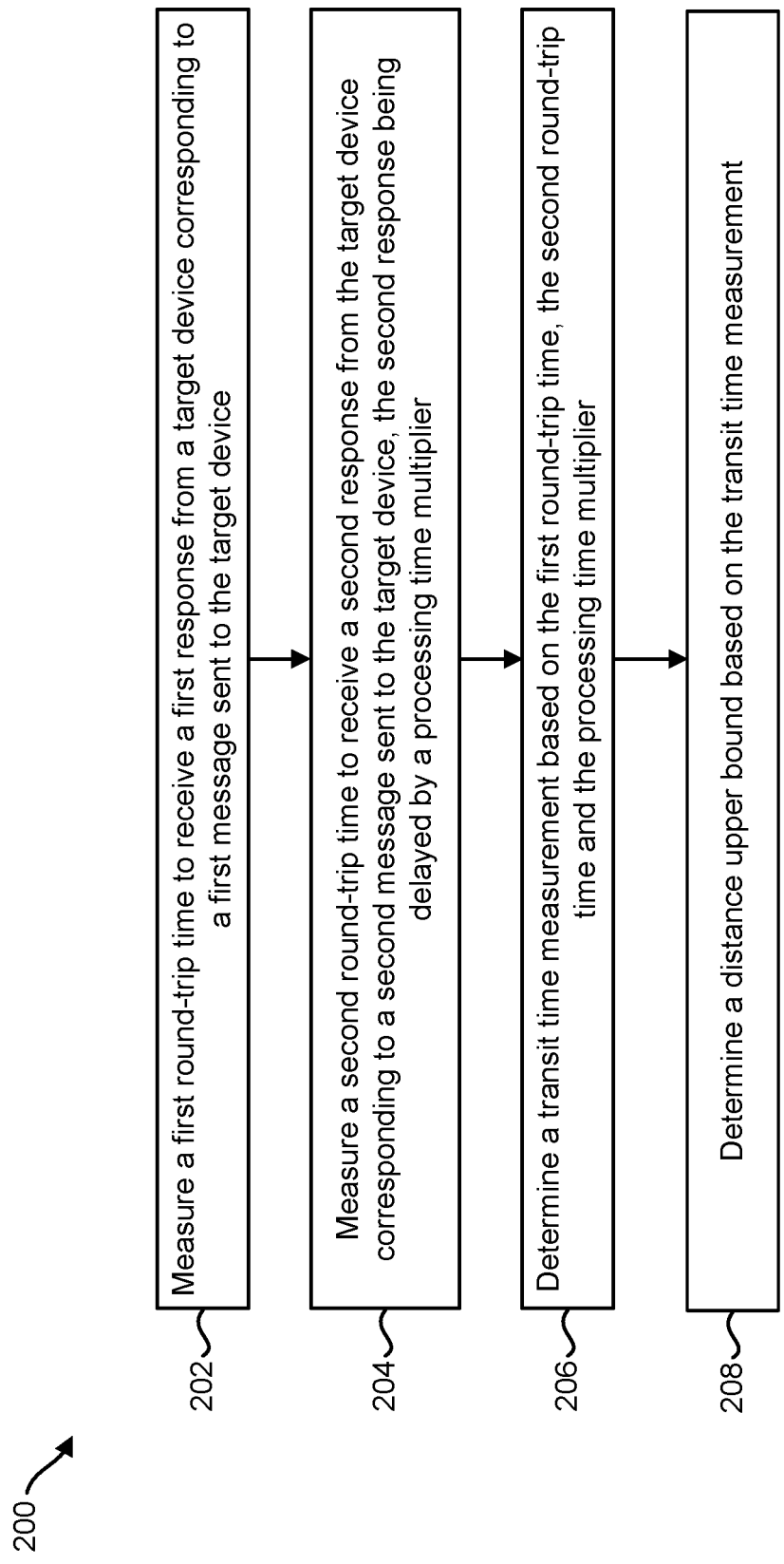
FIG. 2 is a flow diagram illustrating a method for determining a distance upper bound.

FIG. 2 is a flow diagram illustrating a method 200 for determining a distance upper bound 126. The method 200 may be performed by a verifier device 102 that is in communication with a target device 104. In one configuration, the verifier device 102 may be a reader device (e.g., reader/writer) and the target device 104 may be listening device (e.g., card). In another configuration, the verifier device 102 may be a listening device (e.g., card) and the target device 104 may be a reader device (e.g., reader/writer). In an implementation, the verifier device 102 may be an NFC device. The verifier device 102 may communicate with the target device 104 using NFC operations.

The verifier device 102 may measure 202 a first round-trip time 112 to receive a first response 110 from the target device 104 corresponding to a first message 108 sent to the target device 104. The first round-trip time 112 includes the transit time for sending the first message 108 to the target device 104, a processing time 120 by the target device 104 and the transit time to receive the first response 110 from the target device 104. The first round-trip time 112 may be expressed according to Equation (1).

In the configuration where the verifier device 102 is a reader device (e.g., reader/writer), the first message 108 may be a challenge message that the verifier device 102 sends to the target device 104. In this configuration, the verifier device 102 may measure 202 the amount of time that it takes to receive a response to the challenge from the target device 104.

In the configuration where the verifier device 102 is a listening device (e.g., card), the first message 108 may be a response to a challenge message. The verifier device 102 may send the response to the target device 104. In this configuration, the verifier device 102 may measure 202 the amount of time that it takes to receive another challenge message from the target device 104.

The verifier device 102 may measure 204 a second round-trip time 118 to receive a second response 116 from the target device 104 corresponding to a second message 114 sent to the target device 104, the second response being delayed by a processing time multiplier 122. The processing time multiplier 122 indicates an amount of time that the target device 104 delays responding to a message sent by the verifier device 102.

Upon receiving the second message 114, the target device 104 may scale the processing time 120 by the processing time multiplier 122 before responding to the second message 114. The second round-trip time 118 may be expressed according to Equation (2). The second round-trip time 118 includes the transit time for sending the second message 114 to the target device 104, the processing time 120 scaled by the processing time multiplier 122 and the transit time to receive the second response 116 from the target device 104.

In one implementation, the processing time multiplier 122 is a fixed value. In another implementation, the processing time multiplier 122 is determined based on content of the second message 114 sent to the target device 104.

In the configuration where the verifier device 102 is a reader device (e.g., reader/writer), the second message 114 may be a second challenge message that the verifier device 102 sends to the target device 104. In this configuration, the verifier device 102 may measure 204 the amount of time that it takes to receive a response to this second challenge from the target device 104.

In the configuration where the verifier device 102 is a listening device (e.g., card), the second message 114 may be a second response to the second challenge message. The verifier device 102 may send the second response to the target device 104. In this configuration, the verifier device 102 may measure 204 the amount of time that it takes to for the target device 104 to send another challenge message.

The verifier device 102 may determine 206 a transit time measurement 124 based on the first round-trip time 112, the second round-trip time 118 and the processing time multiplier 122. This may be accomplished according to Equation (5).

The verifier device 102 may determine 208 the distance upper bound 126 based on the transit time measurement 124. In an implementation, the verifier device 102 may multiply the transit time measurement 124 by the speed of light to determine the distance upper bound 126.

It should be noted that the described systems and methods may also be implemented at communication speeds slower than the speed of light. However, this may introduce a weakness. For example, consider the use of ultrasound. This is much slower than light, so it would be possible for a malicious device to convert the information to radio/light form, and transmit it over a far greater distance in the same amount of time. Thus, the distance upper bound 126 may be less reliable for speeds less than the speed of light.

Figure 3:
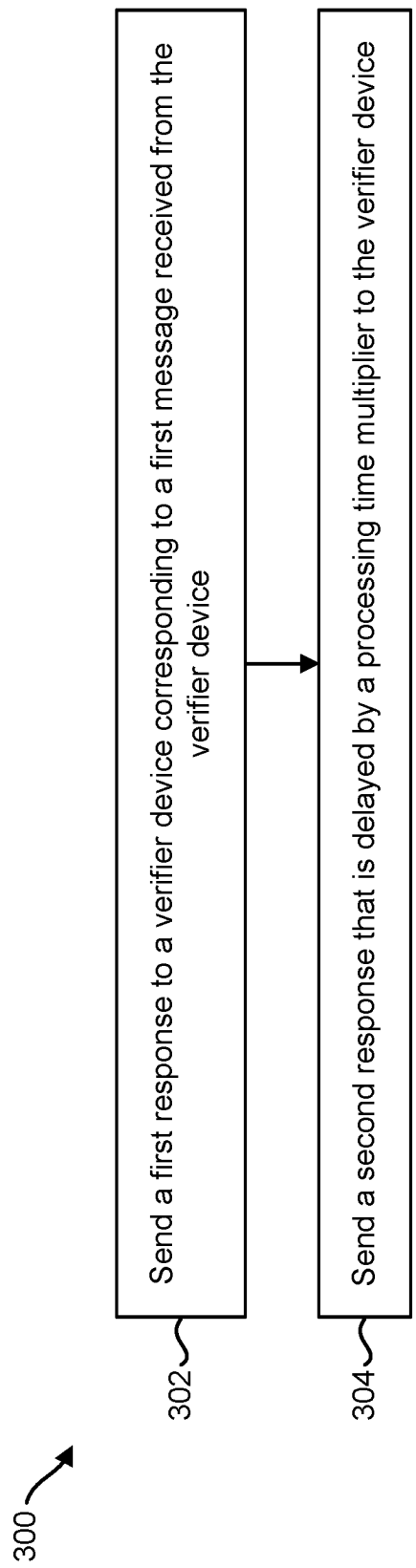
FIG. 3 is a flow diagram illustrating another method for determining a distance upper bound.

FIG. 3 is a flow diagram illustrating another method 300 for determining when to delay sending a response for a distance upper bound 126 determination operation. The method 300 may be performed by a target device 104 that is in communication with a verifier device 102. In an implementation, the target device 104 may be an NFC device. The target device 104 may communicate with the verifier device 102 using NFC operations.

In a configuration, the target device 104 may be a listening device (e.g., card) and the verifier device 102 may be a reader device (e.g., reader/writer). In another configuration, the target device 104 may be a reader device (e.g., reader/writer) and the target device 104 may be listening device (e.g., card).

The target device 104 may send 302 a first response 110 to a verifier device 102 corresponding to a first message 108 received from the verifier device 102. The first message 108 may be received as part of a first round-trip time 112 measurement operation by the verifier device 102, as described in connection with FIG. 1. After processing the received first message 108, the target device 104 may send 302 the first response 110. The processing time 120 may be the amount of time that the target device 104 takes to process the first message 108 received from the verifier device 102.

The target device 104 may send 304 a second response 116 that is delayed by a processing time multiplier 122 to the verifier device 102. The second response 116 may correspond to a second message 114 received from the verifier device 102. The second message 114 may be received as part of a second round-trip time 118 measurement operation by the verifier device 102, as described in connection with FIG. 1.

The processing time multiplier 122 may indicate an amount of time that the target device 104 delays responding to a message sent by the verifier device 102. Upon receiving the second message 114, the target device 104 may scale the processing time 120 by the processing time multiplier 122 before responding to the second message 114.

The verifier device 102 may determine the distance upper bound 126 based on the first round-trip time 112, the second round-trip time 118 and the processing time multiplier 122. This may be accomplished as described in connection with FIG. 1.

FIG. 4 is a block diagram illustrating an example of a relay attack. A first malicious device 428a may be in close proximity to the verifier device 402. A second malicious device 428b may be in close proximity to a target device 404.

The verifier device 402 may be a reader/writer device. For example, the verifier device 102 point-of-sale (POS) terminal. The target device 404 may be listening device. For example, the target device 404 may be a contactless payment card used to pay at a reader/writer (i.e., POS terminal). The first malicious device 428a and the second malicious device 428b may be smart phones.

The verifier device 402 and the target device 404 may be separated by a sufficient distance that they cannot communicate directly with each other. For example, if the verifier device 402 and the target device 404 communicate using NFC or RFID, then communication may be limited to a few centimeters.

In this example, the target device 404 may be used for building access or payment. The security protocols used by the target device 404 may only verify that a device being presented is able to respond correctly to a number of challenges. The first malicious device 428a and the second malicious device 428b may circumvent these security protocols.

The first malicious device 428a may relay the challenge from the verifier device 402 to the second malicious device 428b. The second malicious device 428b may then relay the challenge to the target device 404. The target device 404, may respond to this challenge by sending a response back to the verifier device 402 under attack (via the first malicious device 428a and the second malicious device 428b).

This attack uses genuine cryptographic functions of a payment card and genuine authorizations. This goes back to the verifier device 402 and a fraudulent transaction is made. As far as the verifier device 402 is concerned, it sent the challenge and it received a correct response, which satisfied the security protocols.

If the device under attack (e.g., the verifier device 402) is able to determine that the device being presented (e.g., the target device 404) is physically close, this type of attack becomes far more difficult. Therefore, the verifier device 402 may determine a distance upper bound 126 as described in connection with FIG. 1. If the distance upper bound 126 indicates that the target device 404 is farther than an allowable distance, the verifier device 402 may refuse to authorize a transaction.

FIG. 5 is a sequence diagram illustrating one approach to calculating a transit time 530 by a verifier device 502. In this example, a verifier device 502 (e.g., reader/writer) communicates with a target device 504 (e.g., card). The verifier device 502 may be implemented in accordance with the verifier device 102 of FIG. 1. The target device 504 may be implemented in accordance with the target device 104 of FIG. 1.

The verifier device 502 may send 501 a challenge to the target device 504. The amount of time for signals to travel between the verifier device 502 and the target device 504 is the transit time 530 ($T_f$). Therefore, the amount of time for the challenge to arrive at the target device 504 is the transit time 530a ($T_f$).

The target device 504 may process 503 the challenge. The amount of time to process the challenge and generate a response is the processing time 520 ($T_{proc}$). The target device 504 may send 505 the response back to the verifier device 502. The amount of time for the response to arrive at the verifier device 502 is the transit time 530b ($T_f$). Assuming the distance between the verifier device 502 and the target device 504 has not changed, the transit time 530a ($T_f$) for the challenge and the transit time 530b ($T_f$) for the response are the same.

The round-trip time 512 ($T_{round,1}$) for the challenge/response exchange may be expressed according to Equation (1) above. In this example, the verifier device 502 can measure the round-trip time 512 ($T_{round,1}$) for the challenge/response exchange from the time the challenge is sent to the time the response is received. In other words, $T_{round,1}=T_{proc}+2\cdot T_f$. However, because the verifier device 502 generally does not know the processing time 520 ($T_{proc}$), the verifier device 502 cannot accurately determine the transit time 530 ($T_f$) and, thus, the distance to the target device 504.

FIG. 6 is a sequence diagram illustrating an approach for calculating a transit time 630 according to the described systems and methods. In this example, a verifier device 602 communicates with a target device 604. The verifier device 602 may be implemented in accordance with the verifier device 102 of FIG. 1. The target device 604 may be implemented in accordance with the target device 104 of FIG. 1. The verifier device 602 may be a reader device (e.g., reader/writer), the target device 604 may be a listening device (e.g., card).

The verifier device 602 may measure a first round-trip time 612 ($T_{round,1}$) for an exchange of a first challenge (e.g., a first message 108) and a first response 110. The verifier device 602 may send 601 the first challenge to the target device 604. The amount of time for the first message 108 to arrive at the target device 604 is the transit time 630a ($T_f$).

The target device 604 may start processing 603 the challenge. The amount of time to process the challenge and generate a response is the processing time 620 ($T_{proc}$). The target device 604 may send 605 the first response back to the verifier device 602. The amount of time for the first response 110 to arrive at the verifier device 602 is the transit time 630b ($T_f$).

The verifier device 602 may measure a second round-trip time 618 ($T_{round,2}$) for an exchange of a second challenge (e.g., a second message 114) and a second response 116. The verifier device 602 may send 607 the second challenge to the target device 604. The amount of time for the second challenge to arrive at the target device 604 is the transit time 630c ($T_f$).

The target device 604 may delay 609 processing the second message 114 based on a processing time multiplier 122 ($n$). In this example, the processing time multiplier 122 ($n$) equals 2. Therefore, the target device 604 scales the processing time 620 by a multiple of 2 before responding to the second message 114. In other words, the target device 604 delays its response by twice its internal processing delay.

After the processing delay, the target device 604 may send 611 a second response 116 to the verifier device 602. The amount of time for the second response 116 to arrive at the verifier device 602 is the transit time 630d ($T_f$).

Once again, assuming the distance between the verifier device 602 and the target device 604 has not changed, the transit times 630a-d ($T_f$) are the same.

The verifier device 602 now has two different round-trip times. The verifier device 602 may determine the transit time measurement 124 according to Equation (5). In this case, the processing time multiplier 122 ($n$) is 2. It should be noted that the transit time measurement 124 does not require that the verifier device 602 know the actual processing time 620 of the target device 604.

In this example, $T_{round,1}=T_{proc}+2\cdot T_f$ and $T_{round,2}=2\cdot T_{proc}+2\cdot T_f$. So $2\cdot T_{round,1}=2\cdot T_{proc}+4\cdot T_f$. Therefore, $2\cdot T_{round,1}-T_{round,2}=2T_f$. This gives $T_f=(2\cdot T_{round,1}-T_{round,2})/2$.

FIG. 7 is a sequence diagram illustrating another approach for calculating a transit time 730 according to the described systems and methods. In this example, a verifier device 702 communicates with a target device 704. The verifier device 702 may be implemented in accordance with the verifier device 102 of FIG. 1. The target device 704 may be implemented in accordance with the target device 104 of FIG. 1.

In this approach, the verifier device 702 is a listening device. For example, the verifier device 702 may be a smart phone or another smart listening device. The target device 704 is a reader device (e.g., reader/writer).

The target device 704 may send 701 a first challenge. The amount of time for the first challenge to arrive at the verifier device 702 is the transit time 730a ($T_f$).

The verifier device 702 may send 703 a first response to the first challenge. The verifier device 702 may measure a first round-trip time 712 ($T_{round,1}$) for an exchange of a first response and a second challenge. The amount of time for the first response to arrive at the target device 704 is the transit time 730b ($T_f$).

The target device 704 may start processing 705 the response. The amount of time to process the response and generate a second challenge by the reader/writer is the processing time 720 ($T_{proc,rw}$). The target device 704 may send 707 the second challenge back to the verifier device 702. The amount of time for the second challenge to arrive at the verifier device 702 is the transit time 730c ($T_f$).

The verifier device 702 may send 709 a second response to the second challenge. The verifier device 702 may measure a second round-trip time 718 ($T_{round,2}$) for an exchange of the second response and a third challenge. The amount of time for the second response to arrive at the target device 704 is the transit time 730d ($T_f$).

The target device 704 may delay 711 processing the second response based on a processing time multiplier 122 ($n$). In this example, the processing time multiplier 122 ($n$) equals 2. Therefore, the target device 704 scales the processing time 720 by a multiple of 2 before sending 713 a third challenge. In this approach, the reader/writer may have a constraint that it sends the challenge with a fixed multiple of its processing delay. The amount of time for the third challenge to arrive at the verifier device 702 is the transit time 730e ($T_f$).

Once again, assuming the distance between the verifier device 702 and the target device 704 has not changed, the transit times 730a-e ($T_f$) are the same. The verifier device 702 now has two different round-trip times. The verifier device 702 may determine the transit time measurement 124 according to Equation (5).

It is important that if such a symmetric approach is used, timing measurements are made from the beginning of the exchange. As noted above, a malicious device 328 can pretend to be closer than it is if it knows the transit time 730 of the signals being exchanged. As FIG. 7 shows, the listening device (i.e., the verifier device 702) has to send its second response 116 before it can calculate the transit time 730, so the reader/writer can still spot a device that is claiming to be closer than it actually is.

Figure 8:
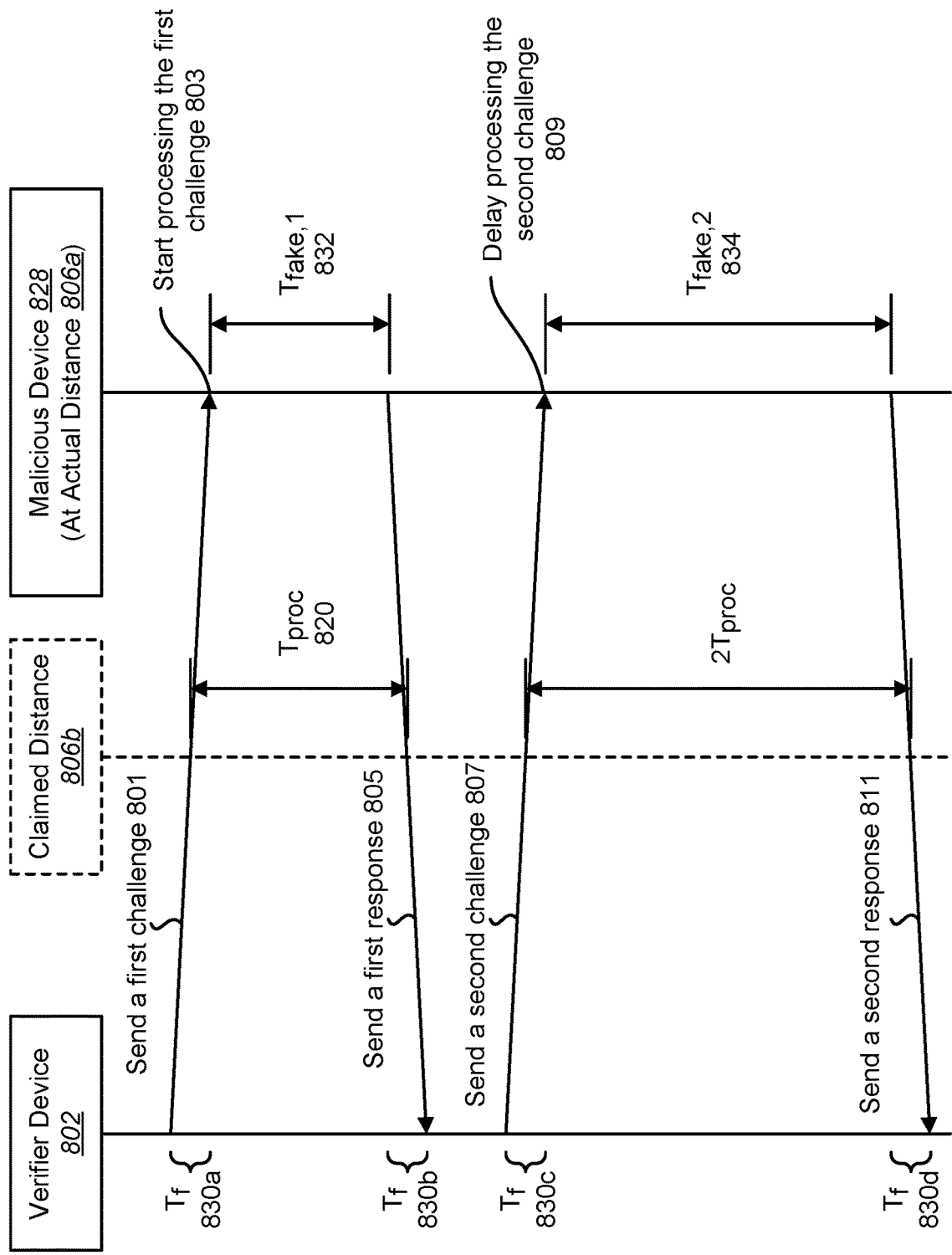
FIG. 8 is a sequence diagram illustrating immunity from distance spoofing according to the described systems and methods.

FIG. 8 is a sequence diagram illustrating immunity from distance spoofing according to the described systems and methods. In this example, a verifier device 802 (e.g., reader/writer) communicates with a malicious device 828. The verifier device 802 may be implemented in accordance with the verifier device 102 of FIG. 1. The malicious device 828 may be separated from the verifier device 802 by an actual distance 806a, but may attempt to indicate that it is at a claimed distance 806b that is closer than the actual distance 806a. Therefore, the malicious device 828 is claiming to be closer than it actually is.

In this example, the processing time multiplier 122 (n) is 2. Therefore, the expected processing time 820 delay for the claimed distance 806b is twice the processing time 820.

The verifier device 802 may send 801 a first message 108 (e.g., a challenge) to the malicious device 828. The amount of time for the first message 108 to arrive at the malicious device 828 is the transit time 830a ($T_f$).

The malicious device 828 may start processing 803 the first challenge. To attempt to spoof the claimed distance 806b, the malicious device 828 may use a fake processing time 832 ($T_{fake,1}$). The fake processing time 832 can be any value. The malicious device 828 may send 805 a first response back to the verifier device 802. The amount of time for the first response to arrive at the verifier device 802 is the transit time 830b ($T_f$).

The verifier device 802 may send 807 the second challenge to the malicious device 828. The amount of time for the second challenge to arrive at the malicious device 828 is the transit time 830c ($T_f$).

The malicious device 828 may delay processing 809 the second challenge by applying a fake processing delay 834 ($T_{fake,2}$) to attempt to spoof the claimed distance 806b before sending 811 a second response. The amount of time for the second response 116 to arrive at the verifier device 802 is the transit time 830d ($T_f$).

Even if the malicious device 828 knew or guessed the processing time multiplier 122 (n), to compute the processing delay 834 ($T_{fake,2}$), the malicious device 828 would need to know the transit time 830 to the verifier device 802 for the claimed distance 806b. As mentioned, in this example, the processing time multiplier 122 (n) equals 2. However, the malicious device 828 cannot spoof the claimed distance 806b by doubling its fake processing time 832 because the amount it has to scale is not a factor of two. This is because the round trips are now longer at the actual distance 806a. The malicious device 828 would have to know how far it is from the verifier device 802 to be able to scale its fake processing time 832, and it cannot do that using the described systems and methods.

Therefore, the verifier device 802 may detect an attack by a malicious device 828. If the malicious device 828 does double its fake processing time 832, the verifier device 802 will see that the relationship of the claimed distance 806b and the transit time 830 is not correct.

Figure 9:
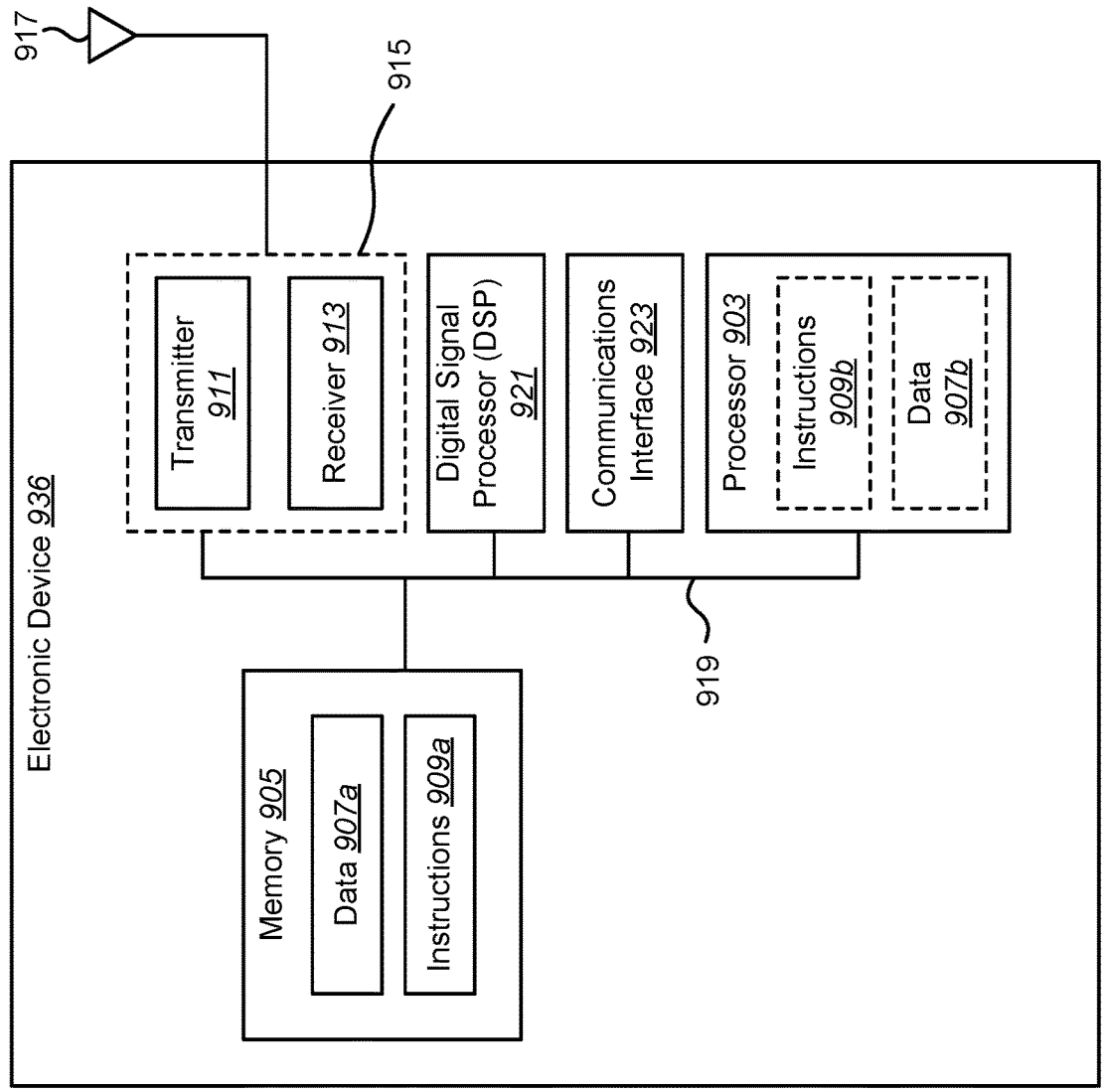
FIG. 9 illustrates certain components that may be included within an electronic device.

FIG. 9 illustrates certain components that may be included within an electronic device 936. The electronic device 936 may be an access terminal, a mobile station, a user equipment (UE), etc. For example, the electronic device 936 may be the verifier device 102 or the target device 104 of FIG. 1.

The electronic device 936 includes a processor 903. The processor 903 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 903 may be referred to as a central processing unit (CPU). Although just a single processor 903 is shown in the electronic device 936 of FIG. 9, in an alternative configuration, a combination of processors (e.g., an ARM and DSP) could be used.

The electronic device 936 also includes memory 905 in electronic communication with the processor (i.e., the processor can read information from and/or write information to the memory). The memory 905 may be any electronic component capable of storing electronic information. The memory 905 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907a and instructions 909a may be stored in the memory 905. The instructions may include one or more programs, routines, sub-routines, functions, procedures, code, etc. The instructions may include a single computer-readable statement or many computer-readable statements. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903.

The electronic device 936 may also include a transmitter 911 and a receiver 913 to allow transmission and reception of signals to and from the electronic device 936 via an antenna 917. The transmitter 911 and receiver 913 may be collectively referred to as a transceiver 915. The electronic device 936 may also include (not shown) multiple transmitters, multiple antennas, multiple receivers and/or multiple transceivers.

The electronic device 936 may include a digital signal processor (DSP) 921. The electronic device 936 may also include a communications interface 923. The communications interface 923 may allow a user to interact with the electronic device 936.

The various components of the electronic device 936 may be coupled together by one or more buses, which may include a power bus, a control signal bus, a status signal bus, a data bus, etc. For the sake of clarity, the various buses are illustrated in FIG. 9 as a bus system 919.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 2 and FIG. 3 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for determining a distance upper bound by a verifier device, comprising:
measuring a first round-trip time to receive a first response from a target device corresponding to a first message sent to the target device;
measuring a second round-trip time to receive a second response from the target device corresponding to a second message sent to the target device, the second response being delayed by a processing time multiplier, wherein the processing time multiplier is a scale factor known by the verifier device and the target device;
determining a transit time measurement based on the first round-trip time, the second round-trip time and the processing time multiplier without knowledge of a processing time of the target device; and
determining the distance upper bound based on the transit time measurement.

2. The method of claim 1, wherein the processing time multiplier indicates an amount of time that the target device delays responding to a message sent by the verifier device.

3. The method of claim 1, wherein upon receiving the second message, the target device scales a processing time by the processing time multiplier before responding to the second message.

4. The method of claim 1, wherein the processing time multiplier is a fixed value.

5. The method of claim 1, wherein the processing time multiplier is determined based on content of the second message sent to the target device.

6. The method of claim 1, wherein the transit time measurement is determined according to $T_f=(n \cdot T_{round,1} - T_{round,2})/2(n-1)$, where $T_f$ is the transit time, n is the processing time multiplier, $T_{round,1}$ is the first round-trip time and $T_{round,2}$ is the second round-trip time.

7. The method of claim 1, wherein determining the distance upper bound comprises multiplying the transit time measurement by the speed of light.

8. The method of claim 1, wherein the distance upper bound comprises an upper bound for a distance between the verifier device and the target device.

9. The method of claim 1, wherein the distance upper bound is determined based on at least one additional transit time measurement in which the target device delays responding according to the processing time multiplier.

10. The method of claim 9, wherein the processing time multiplier comprises a sequence of values, one of the values being applied for a given round-trip time measurement.

11. The method of claim 1, further comprising:
measuring at least one additional round-trip time;
determining at least one additional transit time measurement using the at least one additional round-trip time;
determining an average transit time measurement; and
determining the distance upper bound based on the average transit time measurement.

12. The method of claim 1, wherein the verifier device is a reader device, the target device is a listening device, and the first message and the second message comprise challenge messages sent to the listening device.

13. The method of claim 1, wherein the verifier device is a listening device, the target device is a reader device, and the first message and the second message comprise responses to challenges received from the reader device.

14. A verifier device configured to determine a distance upper bound, comprising:
a processor;
a memory in communication with the processor; and
instructions stored in the memory, the instructions executable by the processor to:
measure a first round-trip time to receive a first response from a target device corresponding to a first message sent to the target device;
measure a second round-trip time to receive a second response from the target device corresponding to a second message sent to the target device, the second response being delayed by a processing time multiplier, wherein the processing time multiplier is a scale factor known by the verifier device and the target device;
determine a transit time measurement based on the first round-trip time, the second round-trip time and the processing time multiplier without knowledge of a processing time of the target device; and
determine the distance upper bound based on the transit time measurement.

15. The verifier device of claim 14, wherein the processing time multiplier indicates an amount of time that the target device delays responding to a message sent by the verifier device.

16. The verifier device of claim 14, wherein the processing time multiplier is a fixed value.

17. The verifier device of claim 14, wherein the processing time multiplier is determined based on content of the second message sent to the target device.

18. The verifier device of claim 14, wherein the transit time measurement is determined according to $T_f=(n \cdot T_{round,1} - T_{round,2})/2(n-1)$, where $T_f$ is the transit time, n is the processing time multiplier, $T_{round,1}$ is the first round-trip time and $T_{round,2}$ is the second round-trip time.

19. The verifier device of claim 14, wherein the distance upper bound is determined based on at least one additional transit time measurement in which the target device delays responding according to the processing time multiplier.

20. An apparatus configured to determine a distance upper bound, comprising:
means for measuring a first round-trip time to receive a first response from a target device corresponding to a first message sent to the target device;
means for measuring a second round-trip time to receive a second response from the target device corresponding to a second message sent to the target device, the second response being delayed by a processing time multiplier, wherein the processing time multiplier is a scale factor known by the apparatus and the target device;
means for determining a transit time measurement based on the first round-trip time, the second round-trip time and the processing time multiplier without knowledge of a processing time of the target device; and
means for determining the distance upper bound based on the transit time measurement.

21. The apparatus of claim 20, wherein the processing time multiplier indicates an amount of time that the target device delays responding to a message sent by the apparatus.

22. The apparatus of claim 20, wherein the processing time multiplier is a fixed value.

23. The apparatus of claim 20, wherein the processing time multiplier is determined based on content of the second message sent to the target device.

24. The apparatus of claim 20, wherein the transit time measurement is determined according to $T_f=(n \cdot T_{round,1} - T_{round,2})/2(n-1)$, where $T_f$ is the transit time, n is the processing time multiplier, $T_{round,1}$ is the first round-trip time and $T_{round,2}$ is the second round-trip time.

25. The apparatus of claim 20, wherein the distance upper bound is determined based on at least one additional transit time measurement in which the target device delays responding according to the processing time multiplier.

26. A computer-program product for determining a distance upper bound, the computer-program product comprising a non-transitory computer-readable medium having instructions thereon, the instructions comprising:
code for causing a verifier device to measure a first round-trip time to receive a first response from a target device corresponding to a first message sent to the target device;
code for causing the verifier device to measure a second round-trip time to receive a second response from the target device corresponding to a second message sent to the target device, the second response being delayed by a processing time multiplier, wherein the processing time multiplier is a scale factor known by the verifier device and the target device;
code for causing the verifier device to determine a transit time measurement based on the first round-trip time, the second round-trip time and the processing time multiplier without knowledge of a processing time of the target device; and
code for causing the verifier device to determine the distance upper bound based on the transit time measurement.

27. The computer-program product of claim 26, wherein the processing time multiplier indicates an amount of time that the target device delays responding to a message sent by the verifier device.

28. The computer-program product of claim 26, wherein the processing time multiplier is a fixed value.

29. The computer-program product of claim 26, wherein the processing time multiplier is determined based on content of the second message sent to the target device.

30. The computer-program product of claim 26, wherein the transit time measurement is determined according to $T_f=(n \cdot T_{round,1}-T_{round,2})/2(n-1)$, where $T_f$ is the transit time, n is the processing time multiplier, $T_{round,1}$ is the first round-trip time and $T_{round,2}$ is the second round-trip time.

31. A method for determining when to delay sending a response for a distance upper bound determination operation, comprising:
sending, by a target device, a first response to a verifier device corresponding to a first message received from the verifier device; and
sending, by the target device, a second response that is delayed by a processing time multiplier to the verifier device, wherein the processing time multiplier is a scale factor known by the verifier device and the target device, the second response corresponding to a second message received from the verifier device, wherein the verifier device determines the distance upper bound based on a first round-trip time, a second round-trip time and the processing time multiplier without knowledge of a processing time of the target device.

32. The method of claim 31, wherein the processing time multiplier indicates an amount of time that the target device delays responding to a message sent by the verifier device.

33. The method of claim 31, wherein upon receiving the second message, the target device scales a processing time by the processing time multiplier before responding to the second message.

34. The method of claim 31, wherein the processing time multiplier is a fixed value.

35. The method of claim 31, wherein the processing time multiplier is determined based on content of the second message received by the target device.

36. A target device configured to determine when to delay sending a response for a distance upper bound determination operation, comprising:
a processor;
a memory in communication with the processor; and
instructions stored in the memory, the instructions executable by the processor to:
send a first response to a verifier device corresponding to a first message received from the verifier device; and
send a second response that is delayed by a processing time multiplier to the verifier device, wherein the processing time multiplier is a scale factor known by the verifier device and the target device, the second response corresponding to a second message received from the verifier device, wherein the verifier device determines the distance upper bound based on a first round-trip time, a second round-trip time and the processing time multiplier without knowledge of a processing time of the target device.

37. The target device of claim 36, wherein the processing time multiplier indicates an amount of time that the target device delays responding to a message sent by the verifier device.

38. The target device of claim 36, wherein upon receiving the second message, the target device scales a processing time by the processing time multiplier before responding to the second message.

39. An apparatus configured to determine when to delay sending a response for a distance upper bound determination operation, comprising:
means for sending a first response to a verifier device corresponding to a first message received from the verifier device; and
means for sending a second response that is delayed by a processing time multiplier to the verifier device, wherein the processing time multiplier is a scale factor known by the verifier device and the apparatus, the second response corresponding to a second message received from the verifier device, wherein the verifier device determines the distance upper bound based on a first round-trip time, a second round-trip time and the processing time multiplier without knowledge of a processing time of the apparatus.

40. The apparatus of claim 39, wherein the processing time multiplier indicates an amount of time that the apparatus delays responding to a message sent by the verifier device.

41. The apparatus of claim 39, wherein upon receiving the second message, the apparatus scales a processing time by the processing time multiplier before responding to the second message.

42. A computer-program product for determining when to delay sending a response for a distance upper bound determination operation, the computer-program product comprising a non-transitory computer-readable medium having instructions thereon, the instructions comprising:
code for causing a target device to send a first response to a verifier device corresponding to a first message received from the verifier device; and
code for causing the target device to send a second response that is delayed by a processing time multiplier to the verifier device, wherein the processing time multiplier is a scale factor known by the verifier device and the target device, the second response corresponding to a second message received from the verifier device, wherein the verifier device determines the distance upper bound based on a first round-trip time, a second round-trip time and the processing time multiplier without knowledge of a processing time of the target device.

43. The computer-program product of claim 42, wherein the processing time multiplier indicates an amount of time that the target device delays responding to a message sent by the verifier device.

44. The computer-program product of claim 42, wherein upon receiving the second message, the target device scales a processing time by the processing time multiplier before responding to the second message.

* * * * *